G. C. TAFT.
Drill Frame.
No. 30,774.  Patented Nov. 27, 1860.
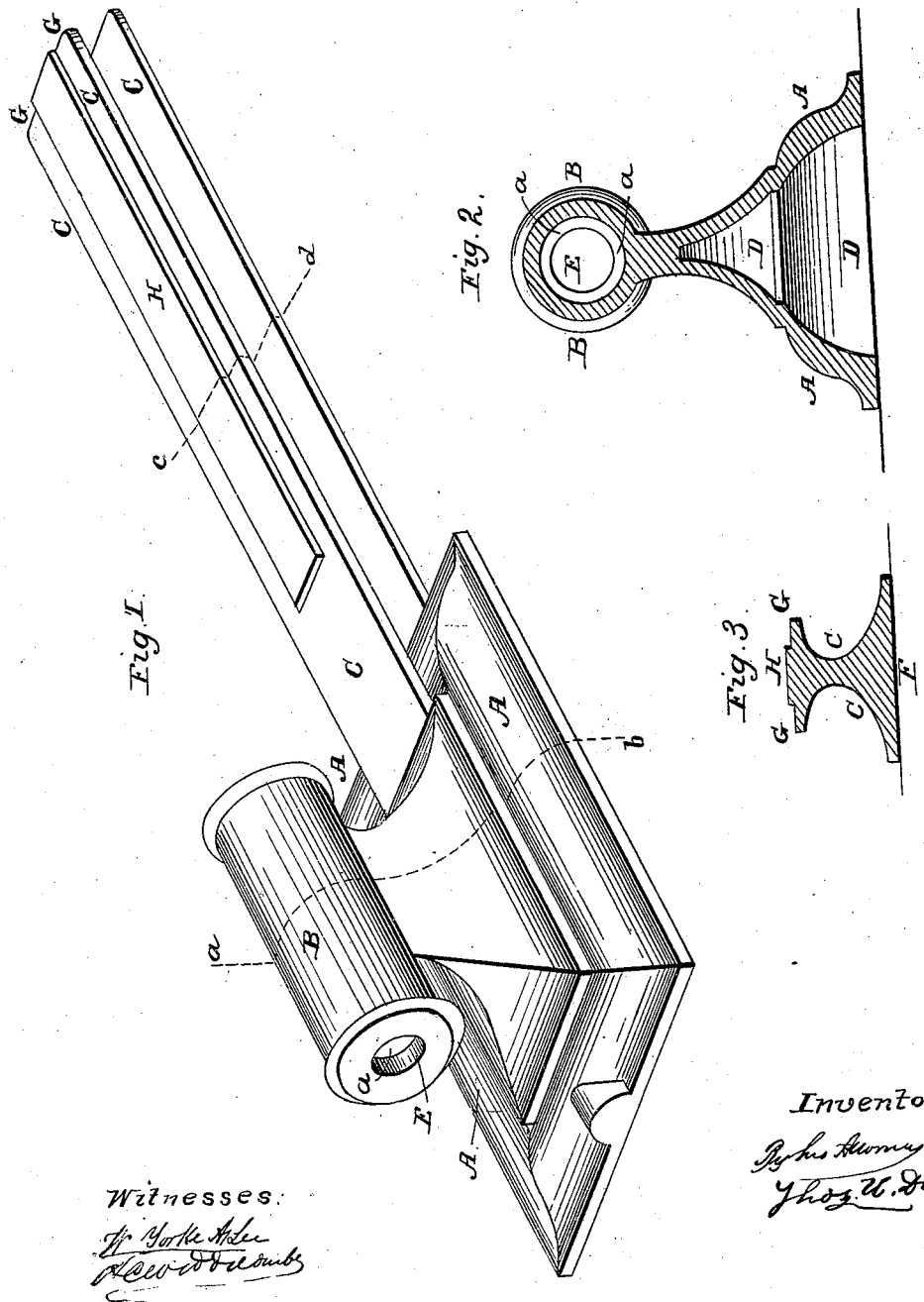
Witnesses:
Inventor:

UNITED STATES PATENT OFFICE.

GEORGE C. TAFT, OF WORCESTER, MASSACHUSETTS.

DRILL-FRAME.

Specification of Letters Patent No. 30,774, dated November 27, 1860.

*To all whom it may concern:*

Be it known that I, GEORGE C. TAFT, of Worcester, in the commonwealth of Massachusetts, have invented a certain new and useful Improvement in the Construction of Portable Drill-Frames; and I do hereby declare that the following is a full, clear, and exact description of the same, reference being had to the accompanying drawing, forming a part of this specification, and in which—

Figure 1 represents a perspective view of my improved frame. Fig. 2 represents a section on line $a$, $b$, and Fig. 3 represents a section on line $c$, $d$.

In the drawings A, represents the base of the frame, B, the head, and C, the tail piece or support to the sliding rest used in drills, and which is so well known that it need not be further described.

The base A, is cored out as shown at D, whereby it is made light and yet strong. The head B, is also cored out as shown at E, whereby all that is necessary to do in order to fit the head for the reception of the drill spindle is to ream it out slightly, and which can be done very quickly. The hole E is cored out more in the center, as shown at $a$, whereby the bearing of the spindle which receives the drill, is only at each end of the head, and consequently there is much less friction than there would be if the hole in the head B was of the same size the entire length.

The tail piece C, is provided with a base F, guide projections G, G, under which the sliding rest works, and a raised portion H, against which a cam or set screw can be made to work from the sliding rest to hold in any desired position for drilling articles.

By forming and casing the base A, head B, and tail piece C, all in one piece, in combination with coring out the base and head as described, portable drill frames can be manufactured more than one-third cheaper than formerly, and that too, while the frame is rendered much more durable, uniform and simple.

What I claim and desire to secure by Letters Patent as an improved article of manufacture, is—

A portable drill frame, in which the parts A, B, C, G, G, are all cast in one piece, in combination with coring out the parts A, and B.

In witness whereof I have hereunto subscribed my name.

GEO. C. TAFT.

In presence of—
   JAMES H. BANCROFT,
   T. H. RICE.